(12) United States Patent  
Rowe

(10) Patent No.: US 7,088,733 B1  
(45) Date of Patent: Aug. 8, 2006

(54) CABLE MODEM TERMINATION SYSTEM FOR UPSTREAM FREQUENCY BAND

(75) Inventor: William J Rowe, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1014 days.

(21) Appl. No.: 09/660,027

(22) Filed: Sep. 12, 2000

(51) Int. Cl.
*H04J 3/16* (2006.01)
*H04N 7/173* (2006.01)

(52) U.S. Cl. .................... 370/437; 370/252; 370/468; 725/124

(58) Field of Classification Search ............... 370/252, 370/468, 480, 437; 455/509, 513, 67.11, 455/67.13; 725/105, 107, 121, 124–125
See application file for complete search history.

(56) References Cited

U.S. PATENT DOCUMENTS

| | | | | |
|---|---|---|---|---|
| 5,943,604 A * | 8/1999 | Chen et al. | ................ | 455/3.06 |
| 6,032,019 A | 2/2000 | Chen et al. | ................ | 455/5.1 |
| 6,058,162 A * | 5/2000 | Nelson et al. | ........... | 379/22.04 |
| 6,291,983 B1 * | 9/2001 | Clarke et al. | ................ | 324/102 |
| 6,377,552 B1 * | 4/2002 | Moran et al. | ................ | 370/241 |
| 6,477,197 B1 * | 11/2002 | Unger | ........................ | 375/222 |
| 6,693,992 B1 * | 2/2004 | Jones et al. | ................ | 379/22.02 |
| 6,697,768 B1 * | 2/2004 | Jones et al. | ................. | 702/189 |
| 6,775,840 B1 * | 8/2004 | Naegel et al. | ............... | 725/111 |

FOREIGN PATENT DOCUMENTS

WO   WO 00 28712 A   5/2000

OTHER PUBLICATIONS

European Patent Office Search Report, Application No. 01302368.2-1246, The Hague, Aug. 31, 2001.

\* cited by examiner

*Primary Examiner*—Chi Pham
*Assistant Examiner*—Tri H. Phan
(74) *Attorney, Agent, or Firm*—Eugene J. Rosenthal

(57) ABSTRACT

The selection of which channel to use by a cable modem terminating system (CMTS) is made a function of input supplied by a spectrum analyzer. Note that typically the cable distribution system has coupled to it at the head end not only the CMTS but also a spectrum analyzer, which has been used in the prior art only for initial establishment and subsequent maintenance of the network, tasks which are performed manually by field technicians. In one embodiment of the invention an interface is established between the CMTS and the spectrum analyzer so that the CMTS and the spectrum analyzer can communicate with each other, and the decision on which channel to use for the upstream is made by the CMTS based at least in part on information provided by the spectrum analyzer. Alternatively, the CMTS and spectrum analyzer are each interfaced to a spectrum controller which makes the decision of which channel to use for the upstream based at least in part on information provided by the spectrum analyzer. The spectrum controller then instructs the CMTS to carry out its decision.

1 Claim, 2 Drawing Sheets

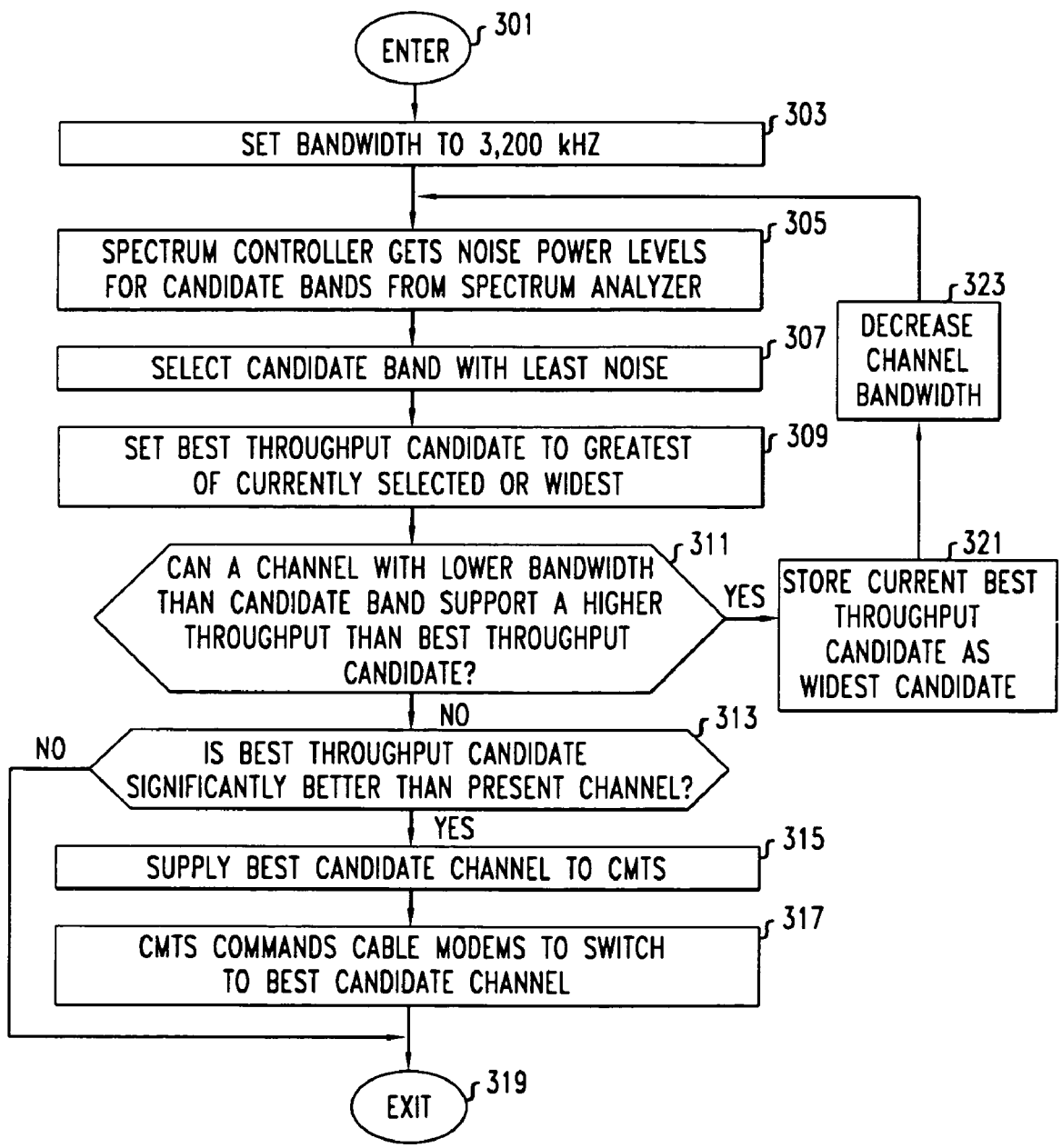

CABLE MODEM TERMINATION SYSTEM FOR UPSTREAM FREQUENCY BAND

TECHNICAL FIELD

This invention relates to the art of cable modem terminating systems, and more particularly, to cable modem terminating systems connected to cable networks which may experience noise on the upstream channel.

BACKGROUND OF THE INVENTION

Conventional cable modem systems use any of the conventional 6 MHz bandwidth television channels for downstream communications, i.e., from the cable modem terminating system to the cable modems. Such television channels are at relatively high frequencies, e.g., 60 MHz and higher. For the upstream communication, i.e., from the cable modems to the cable modem terminating system, relatively low frequencies, e.g., 5–42 MHz, are employed.

The reason that use of such low frequencies has become ubiquitous for upstream communication is because cable was originally only a downstream medium and historically it was deemed desirable to maximize the number of available downstream channels for television use. As the amplifiers that were used in the cable networks were bandwidth limited, and so only could only provide so many channels from the lowest frequency channel allowed by FCC rules in the channel plan to the highest frequency channel that could be amplified by the bandwidth limited amplifier, all the available channels were assigned for downstream use. When it became recognized that upstream communication was desirable, the only spectrum that was available, without sacrificing available television channels, was the bandwidth below the lowest channel in the channel plan. As a result, notwithstanding that higher bandwidth amplifiers that are available today, the art continues to essentially use for the upstream communication only the low frequencies that are below the lowest channel in the channel plan.

Unfortunately, such low frequencies are often subject to noise, which increases the bit error rate and reduces throughput. This noise is typically only within certain frequency ranges. So long as the frequencies selected for the uplink is not within the range of the noise, upstream communication can take place relatively error free.

In an attempt to insure that the upstream communication takes place using an upstream channel that is not in the frequency range of the noise, the prior art teaches that it is possible to change the channel or "hop" from one channel to another. According to one prior art technique the hopping is performed according to a predefined schedule which does not take into account actual conditions on the cable. According to another prior art technique, when the bit error rate is detected to have increased, transmission is halted and a "snapshot" of the channel conditions is taken using a digital signal processor (DSP) which is included in each cable modem terminating system module, also known as a port adapter, which is the head end cable modem that serves a predefined geographic area. The "snapshot" of the channel conditions looks across the whole upstream frequency range, e.g., 5–42 MHz, and determines the power present at each frequency. Using the snapshot it selects the widest possible channel with the lowest power and over the downstream instructs all the cable modems it serves to hop so as to use that channel for the upstream, to which it also tunes.

SUMMARY OF THE INVENTION

I have recognized that such prior art systems using a DSP suffer from several drawbacks. First, their cost is high. Second, because the frequency selection is based on a snapshot, which is focused on a very short period of time, e.g., less than one second, such systems can not be certain that the channel selected will have a sufficient quality to support the upstream for a reasonably long time. Third, analysis performed by such a DSP is relatively limited, e.g., as compared with the analysis that can be performed using a spectrum analyzer.

The disadvantages with the prior art are overcome, in accordance with the principles of the invention, by making the selection of which channel to use by the CMTS a function of input supplied by a spectrum analyzer. Note that typically the cable distribution system has coupled to it at the head end not only the CMTS but also a spectrum analyzer, which has been used in the prior art only for initial establishment and subsequent maintenance of the network, tasks which are performed manually by field technicians.

In one embodiment of the invention an interface is established between the CMTS and the spectrum analyzer so that the CMTS and the spectrum analyzer can communicate with each other, and the decision on which channel to use for the upstream is made by the CMTS based at least in part on information provided by the spectrum analyzer. In another embodiment of the invention, the CMTS and spectrum analyzer are each interfaced to a spectrum controller which makes the decision of which channel to use for the upstream based at least in part on information provided by the spectrum analyzer. The spectrum controller then instructs the CMTS to carry out its decision.

Advantageously, very little cost is added because, as noted, the spectrum analyzer is typically already available for use with the CMTS at the head end of the cable. Further advantageously, the spectrum analyzers employed typically maintain a history of the channel power, which permits the selection of the channel to avoid known periodic noise problems. Still further advantageously, since the spectrum analyzer can monitor channels while they are being used, it is possible to make a decision to hop as the noise level of a currently used channel is increasing, rather than waiting for the bit error rate to reach an unsatisfactory level. Yet even further advantageously, the speed of the selection of the new channel can be increased because it is not necessary to stop service and take the snapshots for all of the channels as was required by the prior art.

BRIEF DESCRIPTION OF THE DRAWING

In the drawing:

FIG. 3 shows another exemplary process for assigning upstream channels in accordance with the principles of the invention.

DETAILED DESCRIPTION

Figure 1:
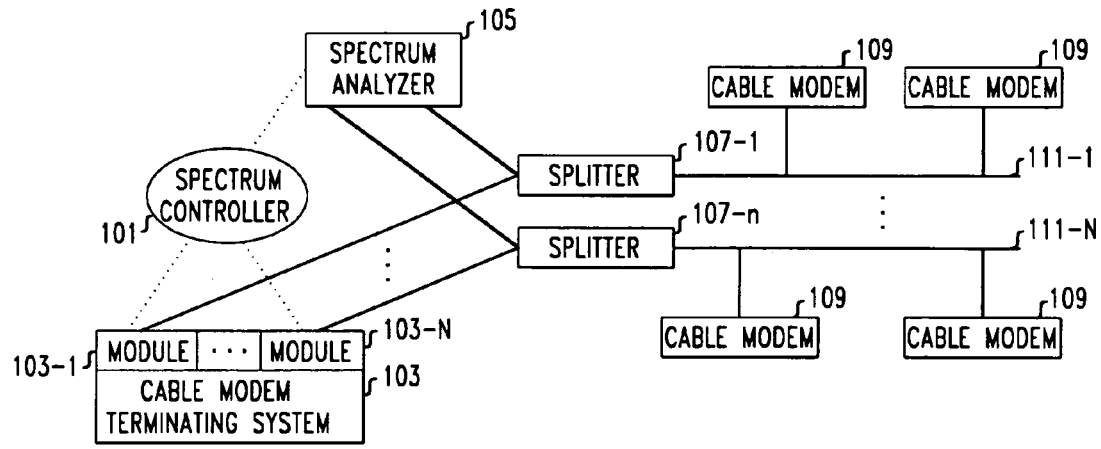
FIG. 1 shows an exemplary cable network arranged in accordance with the principles of the invention.

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGS., including functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

Unless otherwise explicitly specified herein, the drawings are not drawn to scale.

FIG. 1 shows an exemplary cable network arranged in accordance with the principles of the invention. Shown in FIG. 1 are a) spectrum controller 101, b) cable modem terminating system 103, including modules 103-1 through 103-N, c) spectrum analyzer 105, d) splitters 107, including splitters 107-1 through 107-N, e) cable modems 109, and f) cable distribution plants 111, including cable distribution plants 111-1 through 111-N.

As is well known in the art, a cable modem terminating system is a system that enables data to be bi-directionally communicated via cable networks. Such systems, which are located in the cable network head end, receive data destined for various cable modems, e.g., cable modems 109, that are downstream from the cable modem terminating system and place the data into a format and modulation that can be received by the cable modems. The cable modem terminating system also receives data from the various cable modems, demodulates the data and transmits it, typically as internet protocol (IP) on its way to its destination, most often a location on the Internet. A single cable modem terminating system often serves many cable modems, which may be located on different cable distribution plants, e.g., cable distribution plant 111-1 through 111-N.

Cable networks often employ the data over cable system interface specification (DOCSIS) as the protocol for data communication between the cable modems and the cable modem terminating system module. The version of DOCSIS most prevalently employed at present is DOCSIS 1.0, with systems that support DOCSIS 1.1 expected to be released in the near future. DOCSIS includes commands which the cable modem terminating system module employs to instruct the cable modems as to which channel to use for upstream communication.

Cable modem terminating system 103 is similar to a conventional cable modem terminating system, in that it enables data to be transmitted via cable networks, e.g., using DOCSIS or another similar type protocol. Cable modem terminating system 103 is made up of various modules, e.g., modules 103-1 through 103-N, each of which communicates with at least one cable distribution plant. In accordance with an aspect of the invention, cable modem terminating system 103 includes at least one communications port by which it may communicate with an external device, e.g., spectrum analyzer 105 or spectrum controller 101, in regard to the particular frequencies to be employed in the upstream channels. In one embodiment of the invention, each of modules 103-1 through 103-N may include such a communications port and may communicate with spectrum analyzer 105. In another embodiment of the invention, each of modules 103-1 through 103-N may include such a communications port but only one of them is employed for the communications with spectrum analyzer 105. In yet another embodiment of the invention, there is only a single communications port in cable modem terminating system 103 which serves all of modules 103-1 through 103-N.

Cable modem terminating system 103 employs a communications protocol for communicating via its communications port, e.g. simple network management protocol (SNMP) running over internet protocol (IP). Advantageously, a proprietary protocol need not be developed, nor does the connection between cable modem terminating system 103 and spectrum analyzer 105 need to be a direct one. To reduce latency, preferably, the communication should be over a reliable and traffic managed network. Spectrum analyzer 105 is a conventional spectrum analyzer that has a communications port for use in communicating with an outside unit. Spectrum analyzer 105 may employ simple network management protocol (SNMP) running over internet protocol (IP) as its communications protocol. Preferably, spectrum analyzer 105 includes memory sufficient for storing a history of each of the channels of the cable distribution plant to which it is coupled. The length of the history is preferably two weeks, so as to capture various business cycles. However, the actual length is not critical.

Splitters 107 allows both cable modem terminating system 103 and spectrum analyzer 105 to be coupled to the channels.

Cable modems 109 are conventional cable modems that are frequency agile, i.e., they can be commanded by the cable modem terminating system to which they are connected to change the frequency of the channel they are using for the upstream communication.

Each of cable distribution plants 111 is a distribution system for a) television service, b) data service, e.g., Internet, and c) other services, e.g., telephone, security and other monitoring. Typically cable distribution plants 111 are hybrid fiber-coax (HFC) links, although all coax or all fiber is also possible.

Optional spectrum controller 101 is arranged to communicate with cable modem terminating system 103 and spectrum analyzer 105, in accordance with an aspect of the invention. Spectrum controller 101 receives channel power information from spectrum analyzer 105 and bit error rate information from cable modem terminating system 103. In accordance with the principles of the invention, using the received information, spectrum controller 101 informs cable modem terminating system 103 which upstream channel should be used by various ones of the cable modems. This may be done on an upstream-by-upstream basis, a modem-by-modem basis, a plant-by-plant basis, or any combination thereof. Cable modem terminating system 103 then uses the information regarding the assignment of cable modems from spectrum controller 101 to assign upstream frequencies to the various cable modems. Cable modem terminating system 103 may contribute to the process, in accordance with an aspect of the invention, by further refining the upstream channel assignments, e.g., using load balancing techniques to even out traffic flows on upstreams when a plant supports multiple upstreams.

In another embodiment of the invention the functionality of spectrum controller 101 is embedded in cable modem terminating system 103.

Figure 2:
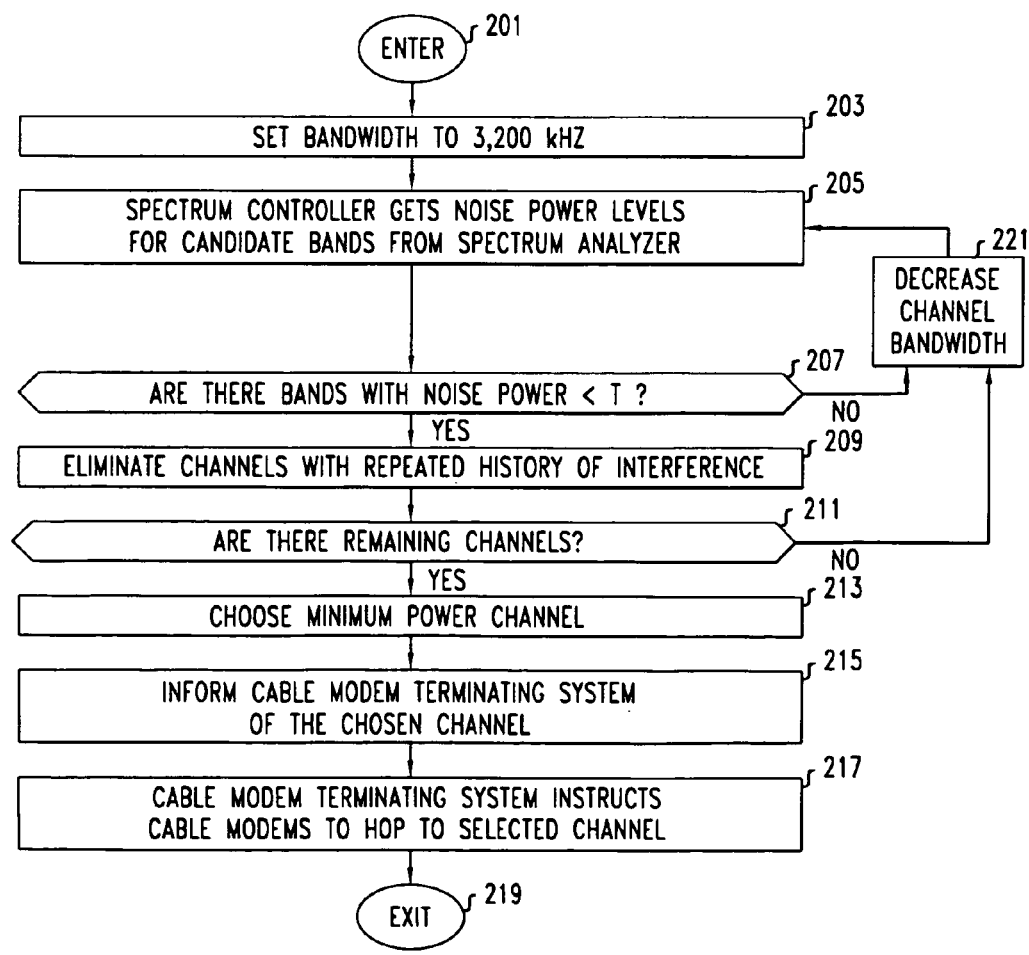
FIG. 2 shows an exemplary process, in flowchart form, for assigning upstream channels in accordance with the principles of the invention.

FIG. 2 shows an exemplary process, in flowchart form, for assigning upstream channels in accordance with the principles of the invention. The process as described in FIG. 2 is for the embodiment of FIG. 1 that includes spectrum controller 101. Note that if spectrum controller 101 is not included as a separate unit then the functionality described for spectrum controller 101 may be performed by cable modem terminating system 103.

Prior to executing the process of FIG. 2 it is assumed that the cable network has been initially set up and provisioned with certain information such as the possible cable modem service channels. According to the DOCSIS protocol, these channels may have a bandwidth of 200, 400, 800, 1600, and 3200 KHz. The process is entered in step 201 either upon a) system initialization, b) when cable modem terminating system 103 detects a bit error rate greater than a predetermined threshold, or c) spectrum analyzer 105 issues a trap message, i.e., an indication that power on the channel being monitored has exceed a predefined level.

In step 203, the bandwidth size for a channel to be searched for is set to 3200 KHz. Next, in step 205, spectrum controller 101 gets from spectrum analyzer 105 the noise power levels for the candidate bands, i.e., those frequency segments that have the bandwidth of a channel to be searched for that are within the bandwidth areas identified as the possible cable modem upstream service channels. Thereafter, conditional branch point 207 tests to determine if there are-bands within the candidate bands that have a noise power less than a defined threshold T for the particular width channel being searched for. As part of this determination the particular bands, if any, are identified and retained as candidates.

If the test result in step 207 is YES, indicating that there are bands within the candidate bands that have a noise power less than a defined threshold T for the particular width channel being searched for, control passes to step 209 in which any channels that, based on information received from spectrum analyzer 105 in accordance with the principles of the invention, display a history of interference are eliminated. Control then passes to conditional branch point 211 which tests to determine if there yet remains any candidate channels.

If the test result in step 211 is YES, indicating that there remains channels that have a noise power less than the defined threshold T for the particular width channel being searched for and do not have a history of interference, control passes to step 213. In step 213, the channel with the minimum noise power from the remaining candidate channels is selected. Spectrum controller 101 supplies to cable modem terminating system 103 the particular channel with minimum power selected in step 213. Thereafter, in step 217, cable modem terminating system 103 commands cable modems 109 to hop to the selected channel. The process then exits in step 219.

If the test result in step 207 is NO, indicating that there are no bands within the candidate bands that have a noise power less than threshold T for the particular width channel being searched for, or the test result in step 211 is NO, indicating that there are no channels that have a noise power less than threshold T for the particular width channel being searched for that do not have a history of interference, control passes to step 221. In step 221, the channel width being searched for is decreased by one size. Control then passes back to step 205, and the process continues as described above.

FIG. 3 shows another exemplary process, in flowchart form, for assigning upstream channels in accordance with the principles of the invention. As with FIG. 2, the process as described in FIG. 3 is for the embodiment of FIG. 1 that includes spectrum controller 101. Note that if spectrum controller 101 is not included as a separate unit then the functionality described for spectrum controller 101 may be performed by cable modem terminating system 103.

Again, as with the process of FIG. 2, prior to executing the process of FIG. 3 it is assumed that the cable network has been initially set up and provisioned with certain information, such as the possible cable modem service channels. According to the DOCSIS protocol, these channels may have a bandwidth of 200, 400, 800, 1600, and 3200 KHz. The process is entered in step 301 a) upon system initialization, b) when cable modem terminating system 103 detects a bit error rate greater than a predetermined threshold, c) when spectrum analyzer 105 issues a trap message, i.e., an indication that power on the channel being monitored has exceed a predefined level, or d) according to a predefined schedule.

In step 303, the bandwidth size for a channel to be searched for is set to 3200 KHz. Next, in step 305, spectrum controller 101 gets from spectrum analyzer 105 the noise power levels for the candidate bands, i.e., those frequency segments that have the bandwidth of a channel to be searched for that are within the bandwidth areas identified as the possible cable modem upstream service channels. Thereafter, in step 307, the candidate bandwidth that supports the maximum throughput based on the spectrum-analyzer-supplied information, i.e., the channel that has the least noise, is selected as the current candidate. In step 309, the best throughput channel is set as the one of the current candidate or the widest candidate, if there is one from a previous iteration of that portion of the process which selects one, that has the greatest throughput.

Control then passes to conditional branch point 311 which tests to determine if a lower bandwidth channel than that of the current candidates bandwidth might result in better throughput than that of the best throughput channel. This is possible if the best throughput channel is very noisy, and so the throughput is reduced as a result of errors caused by the noise, so that a smaller bandwidth but less noisy channel, which would suffer from less errors, could actually succeed in having a greater throughput. Thus, given the noise information from the spectrum analyzer, the spectrum controller determines if it is theoretically possible for a smaller bandwidth channel to have a better throughput than that of the current best throughput channel.

If the test result in step 311 is YES, indicating that it is theoretically possible for a smaller bandwidth channel to have better throughput than the current best throughput channel, control passes to step 321 in which the current best throughput channel is stored as the widest candidate. Next, in step 323, the channel width being searched for is decreased by one size. Control then passes back to step 305, and the process continues as described above.

If the test result in step 311 is NO, indicating that it is not theoretically possible for a smaller bandwidth channel to have better throughput than the current best throughput channel, control passes to conditional branch point 313. Conditional branch point 313 tests to determine if the current greatest throughput channel has a throughput that is significantly, e.g., XX%, better than that of the channel currently actually being used.

If the test result in step 313 is YES, indicating that the current greatest throughput channel has a throughput that is significantly better than that of the channel currently actually being used, control passes to step 315, in which spectrum controller 101 supplies to cable modem terminating system 103 the current greatest throughput channel, which was selected in step 309. Thereafter, in step 317, cable modem terminating system 103 commands cable modems 109 to hop to the selected channel. The process then exits in step 319.

If the test result in step 313 is NO, indicating that the current greatest throughput channel does not have a throughput that is significantly better than that of the channel currently actually being used, and so there is no motivation to change the currently used channel, control passes to step 319 and the process is exited.

As part of exiting the process it is possible to schedule a recheck time for the currently selected channel. This rechecking may be a function of statistics developed by the spectrum analyzer that indicate a point at which the selected channel has significant increases in the noise that it experiences. Thus, advantageously, a channel may be selected for periods of time when it has low noise and avoided for periods of time when it has high noise so as to yield overall the best upstream channel performance for a cable.

What is claimed is:

1. A method for use in connection with a cable modem system having a cable modem terminating system module and a spectrum analyzer each having a communication port, the method comprising the step of searching for a candidate channel having a specified bandwidth within the spectrum allocated for use as upstream channels that are indicated by said spectrum analyzer to have an acceptable noise level over a prescribed period of time wherein said searching step failed to find a channel with an acceptable noise level over said prescribed period, the method further comprising the steps of:

reducing said prescribed period of time; and
repeating said searching step.

\* \* \* \* \*